United States Patent
Lopez

(10) Patent No.: US 8,116,953 B2
(45) Date of Patent: Feb. 14, 2012

(54) ACTIVE THERMAL MANAGEMENT SYSTEM AND METHOD FOR TRANSMISSIONS

(75) Inventor: Richard J Lopez, Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 540 days.

(21) Appl. No.: 11/971,985

(22) Filed: Jan. 10, 2008

(65) Prior Publication Data

US 2009/0182473 A1 Jul. 16, 2009

(51) Int. Cl.
*G06F 17/00* (2006.01)
*B60W 10/04* (2006.01)
*B60K 17/00* (2006.01)

(52) U.S. Cl. .......................... 701/54; 477/115; 180/337

(58) Field of Classification Search .................... 701/51, 701/52, 54; 477/115, 2, 32, 33, 5; 180/65.21, 180/65.275
See application file for complete search history.

(56) References Cited

U.S. PATENT DOCUMENTS 6,427,640 B1 * 8/2002 Hickey et al. .............. 123/41.31
2006/0243814 A1 * 11/2006 Rimmer et al. ............. 236/49.3
* cited by examiner

*Primary Examiner* — James Trammell
*Assistant Examiner* — Muhammad Shafi
(74) *Attorney, Agent, or Firm* — Quinn Law Group, PLLC

(57) ABSTRACT

An active thermal management system and method for selectively warming and cooling transmission fluid in a transmission usable with a vehicular engine is provided. The active thermal management system includes a thermal sensor which measures transmission fluid temperature and signals a valve to selectively communicate transmission fluid flow into one or more discrete fluid circuits.

15 Claims, 2 Drawing Sheets

ACTIVE THERMAL MANAGEMENT SYSTEM AND METHOD FOR TRANSMISSIONS

TECHNICAL FIELD

This invention relates to a thermal management system and method for transmission fluid conditioning used in vehicular applications. Transmission fluid is heated or cooled depending upon specific vehicle applications and current driving needs in order to improve drivability, efficiency, and durability.

BACKGROUND OF THE INVENTION

To operate at optimal levels, vehicular transmissions may require that the transmission fluid be heated above, or cooled below, normal-use operating temperatures. Under high-load conditions, such as while towing significant weight, transmission fluid may become over-heated and require cooling in order to avoid adverse effects on driving conditions or durability of the transmission system itself. Under normal driving conditions, transmission fluid may need to be warmed. Warming transmission fluid reduces spin loss, which increases efficiency of the transmission and, in turn, increases overall vehicle fuel efficiency. Vehicles which are not used for heavy duty towing applications will rarely reach optimum transmission fluid temperature.

SUMMARY OF THE INVENTION

The active thermal management system for transmissions provided actively accomplishes both warming and cooling of transmission fluid to predetermined requirements without significant impact to passenger compartment heating or engine cooling operations. The system includes a dual end-tank, dual path transmission conditioner arrangement with a control valve operated in response to fluid temperature readings taken by a thermal sensor.

Transmission fluid below a calibrated or predetermined temperature is directed by the control valve to a heating circuit where it is warmed to the desired temperature. As fluid temperature exceeds the desired limit, the control valve begins to redirect the transmission fluid from the heating circuit to a cooling circuit, which reduces fluid temperature. In an exemplary embodiment, the control valve modulates flow simultaneously between both circuits, allowing sustained operation at, or very near, the calibrated or desired transmission fluid temperature.

Numerous heating and cooling sources may be used to heat or cool the transmission fluid in this system. An embodiment is provided to both heat and cool transmission fluid by taking advantage of the relative hot and cold tank portions of an air to water (coolant) radiator used to cool the engine. Transmission fluid to engine coolant heat exchangers on the inlet portion (hot tank) and outlet portion (cold tank) of the radiator allow each discrete circuit to increase or decrease temperature from a single radiator. Additional cooling methods may include an air to oil type heat exchanger placed in the cooling circuit, either alone or in combination with the radiator cold tank, to directly cool transmission fluid with ambient airflow.

A method of active thermal management for transmissions is provided wherein transmission fluid outflow is selectively directed into discrete heating and cooling circuits. The method contemplates continuously sensing the temperature of transmission fluid outflow to determine variance from a predetermined temperature. Where the sensor determines that fluid is below the predetermined temperature, the control valve directs fluid to the discrete heating circuit. The heating circuit contains a heating source which warms the transmission fluid as it flows through the circuit. Where the sensor determines that fluid temperature is above the predetermined temperature, the control valve directs fluid to the discrete cooling circuit. The cooling circuit contains a cooling source (a heat sink) which cools the transmission fluid as it flows through the circuit. The transmission fluid flowing through either, or both, the heating and cooling circuit is then returned to the transmission.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
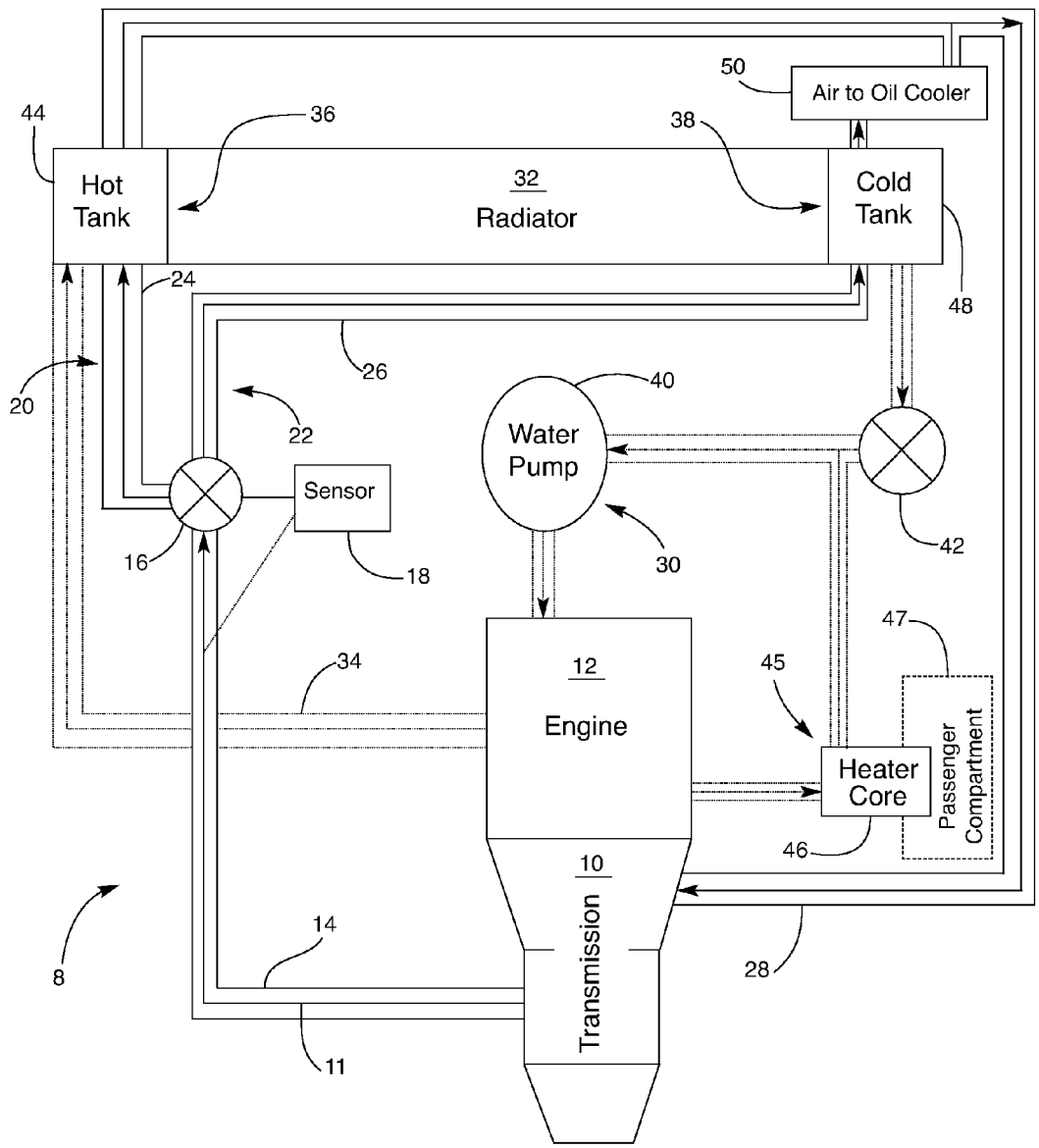
FIG. 1 is a schematic representation of an embodiment of the active thermal management system for transmissions claimed in this application, including a transmission, an engine, and an engine cooling system.

Referring to the drawings, FIG. 1 schematically shows an active thermal management system 8 for a transmission 10 operating in a vehicle (not shown) with a vehicular engine 12. Internal pressure of the transmission 10 causes transmission fluid 11 to flow out of transmission 10 through a fluid conduit 14 to a valve 16. Pressure sources within the transmission will be recognized by those in the art, but could include, without limitation: a gear pump, a torque converter pump, a separate oil pump, et cetera. Control systems for the active thermal management system include a sensor configured to measure a material property of the transmission fluid and an actuator configured to manipulate the valve. The control system in the embodiment depicted includes device 18 that is both the sensor and the actuator. The device 18 is placed in thermal communication with the transmission fluid, and is used to measure transmission fluid temperature. Device 18 is operatively connected to valve 16, which is configured to selectively communicate the flow of transmission fluid to one or more discrete fluid circuits; FIG. 1 contains two such circuits, discussed below.

Other embodiments of active thermal management systems for transmissions could sense material properties other than temperature and include myriad control system configurations; device 18 is just one embodiment of a usable control system. The control system could sense transmission fluid viscosity and direct operation of one or more valves based upon this measurement. In such a system, fluid having a viscosity higher than a predetermined target would be heated in order to reduce viscosity and allow the transmission to operate more efficiently. Those skilled in the art will recognize that numerous valve types and configurations can be used in the active thermal management system 8. Other possible valve configurations are discussed below. These different control systems for the valve do not affect the overall operating cycle of the active thermal management system 8.

When the fluid temperature is below a predetermined temperature or target value, device 18 signals the valve 16 to direct transmission fluid 11 into a first fluid circuit 20 which is in fluid communication with valve 16 via a fluid conduit 24.

When the fluid temperature is above a predetermined temperature, device 18 signals the valve 16 to direct transmission fluid into a second fluid circuit 22, which is discrete from the first fluid circuit 20, and is in fluid communication with valve 16 via a fluid conduit 26. After flowing through one of the fluid circuits 20 or 22, transmission fluid returns to the transmission 10. In the embodiment shown in FIG. 1, this is accomplished with a common return line or path, fluid conduit 28. The device 18 would preferably be set to a predetermined fluid temperature in a range that would allow the transmission to operate both at a sufficiently high enough temperature to minimize fuel efficiency losses due to transmission spin loss, but at a sufficiently low enough temperature to avoid damage to the transmission during high-load conditions.

The device 18 may be any type of sensor known to persons skilled in the art, as long as it is a device that responds to a physical stimulus (temperature of the transmission fluid) and transmits a resulting impulse (mechanical, electrical, et cetera) capable of directing operation of valve 16. The device 18 may be located anywhere along the fluid flow path between, and inclusive of, the transmission 10 and the valve 16, as long as it is operable to sense transmission fluid temperature and direct operation of valve 16. In one embodiment, the device 18 and valve 16 are integrated into a single, combined mechanism that functions both to sense transmission fluid temperature and direct transmission fluid flow. Those skilled in the art will recognize numerous possible sensors, valves, and integrated mechanisms to accomplish the functions of both the control system and valve. One acceptable integrated mechanism is a thermal control valve actuated by a wax drive motor. In such a wax drive thermal control valve, a wax block bears on a plunger when the wax is heated and the plunger alters fluid flow through the valve. As used in an embodiment of this invention, transmission fluid passing through the control valve would heat the wax block, and the plunger would alter flow into fluid circuits 20 and 22. Thus, the wax block both senses temperature and manipulates the position of the valve.

Device 18 combines sensing and actuating functions in the control system. However, and within the scope of the claimed invention, separate sensors and actuators may be employed. For example, and within the scope of the claimed invention, the control system may include an electronic sensor configured to measure the material property of the fluid, an electronic controller, and an actuator, such as an electric motor or solenoid, operatively connected to the valve. In such an embodiment, the controller would be configured to cause the solenoid to move the valve in response to signals from the sensor that indicate the measured material property of the fluid.

In an exemplary embodiment, the valve 16 is capable of modulating transmission fluid flow between both the first fluid circuit 20 and the second fluid circuit 22 when the transmission fluid is near the predetermined target temperature. This modulation allows continuous flow through the active thermal management system 8 while maintaining transmission fluid temperature at or very near the predetermined target temperature. A wax drive thermal control valve is also capable of modulating flow in this manner.

Those skilled in the art will recognize alternative configurations—in addition to the integrated wax drive thermal control valve described above and the single valve 16 shown in FIG. 1—for performing the functions of valve 16. One embodiment could include two fluid conduits carrying transmission fluid outflow, each having its own valve. Each of these valves (not shown) could be varied by the control system to regulate flow into the first and second fluid circuits 20 and 22. The combined function of these two valves would result in a similar ability to selectively provide a ratio of flow through the circuits 20 and 22 calculated to result in optimal transmission fluid characteristics. These different valve configurations do not affect the overall operating cycle of the active thermal management system 8.

FIG. 1 further includes an engine coolant system 30, wherein coolant (such as antifreeze, water, glycol, or other suitable fluid) is circulated from the engine 12 through a radiator 32. While many engine cooling systems will be recognized by those skilled in the art, the embodiment represented in FIG. 1 is an air-to-water type heat exchanger. The terms "water," "coolant," and "coolant fluid" are used interchangeably in this application, and by those skilled in the art, with respect to engine cooling systems. In FIG. 1, engine coolant flows from engine 12 through a fluid conduit 34 to the radiator 32, which has a relatively hot (inlet) side 36 and a relatively cold (outlet) side 38. The temperature drop occurs as coolant, at relatively high temperature as it leaves the engine, moves from the hot side 36 through the air to water heat exchanger and is cooled by ambient airflow before reaching the cold side 38. As will be recognized by those skilled in the art, the engine coolant system 30 may be operated by a water pump 40 to circulate coolant and a thermostat 42 to control circulation.

In applications where efficient operation requires that transmission fluid be selectively warmed, the first fluid circuit 20 may include a heat source operably connected to allow heat transfer into the circulating transmission fluid. Those skilled in the art will recognize that any number of heat sources could be used to accomplish this goal. FIG. 1 includes one possible embodiment, which attaches a heat exchanger to the hot side 36 of the radiator 32, to take advantage of hot engine coolant before it is cooled by exposure to ambient air in the heat exchanger of radiator 32. This hot tank 44 is a water-to-oil type heat exchanger, which places the hot engine coolant in heat transfer relationship with the transmission fluid. Other possible heat sources include, without limitation: electric heaters, routing transmission fluid through other parts of the engine coolant system, capturing exhaust heat, et cetera. One available heat source is a passenger compartment heater circuit 45, including a heater core 46, which is configured to use hot engine coolant to warm the passenger compartment 47 by conventional means (not shown). The embodiment represented in FIG. 1 does not utilize the heater core 46 as a heat source; therefore the first fluid circuit 20 is not in heat transfer relationship with the heater core 46 or any other portion of the passenger compartment heater circuit 45. One disadvantage of using the heater core 46 to warm transmission fluid is a negative impact on the ability to heat the passenger compartment 47, compensation for which may require redesign or modification of the passenger compartment heating system.

In applications where durability or drivability concerns require that transmission fluid be selectively cooled, the second fluid circuit 22 may include a heat sink operably connected to allow heat transfer out of the transmission fluid. Those skilled in the art will recognize that any number of heat sinks could be used to accomplish this goal. FIG. 1 includes one possible embodiment, the cold tank 48, which attaches a heat exchanger to the cold side 38 of the radiator 32, to take advantage of cold engine coolant after it has been cooled by exposure to ambient air in the heat exchanger of radiator 32. This cold tank 48 is a water-to-oil type heat exchanger, which places the relatively cold engine coolant in heat transfer relationship with the transmission fluid. Other possible heat sinks include, without limitation: air to fluid heat exchangers, thermoelectric devices, fin-type heat sinks, et cetera. The embodiment represented in FIG. 1 further contains an auxiliary heat sink, an air-to-oil type cooler 50, placed in fluid communication with the second fluid circuit 22 to further cool the transmission fluid.

Those skilled in the art will recognize that, in relation to coolant flow through the engine coolant system, hot and cold are relative terms describing normal operation of the engine coolant system. Those skilled in the art will further recognize that the direction of heat transfer between transmission fluid and the heating or cooling sources will, in practice, be determined by the relative temperatures of the two media in heat transfer relationship.

Further variations of an active thermal management system for transmissions could include additional sensors (thermal, viscosity, or otherwise) taking additional readings of the transmission fluid, heating sources, and cooling sources. When combined with a computer control system, these additional sensors may allow more-precise determinations of the optimal fluid flow ratio between the hot and cold circuits in order to maintain the predetermined target temperature.

Figure 2:
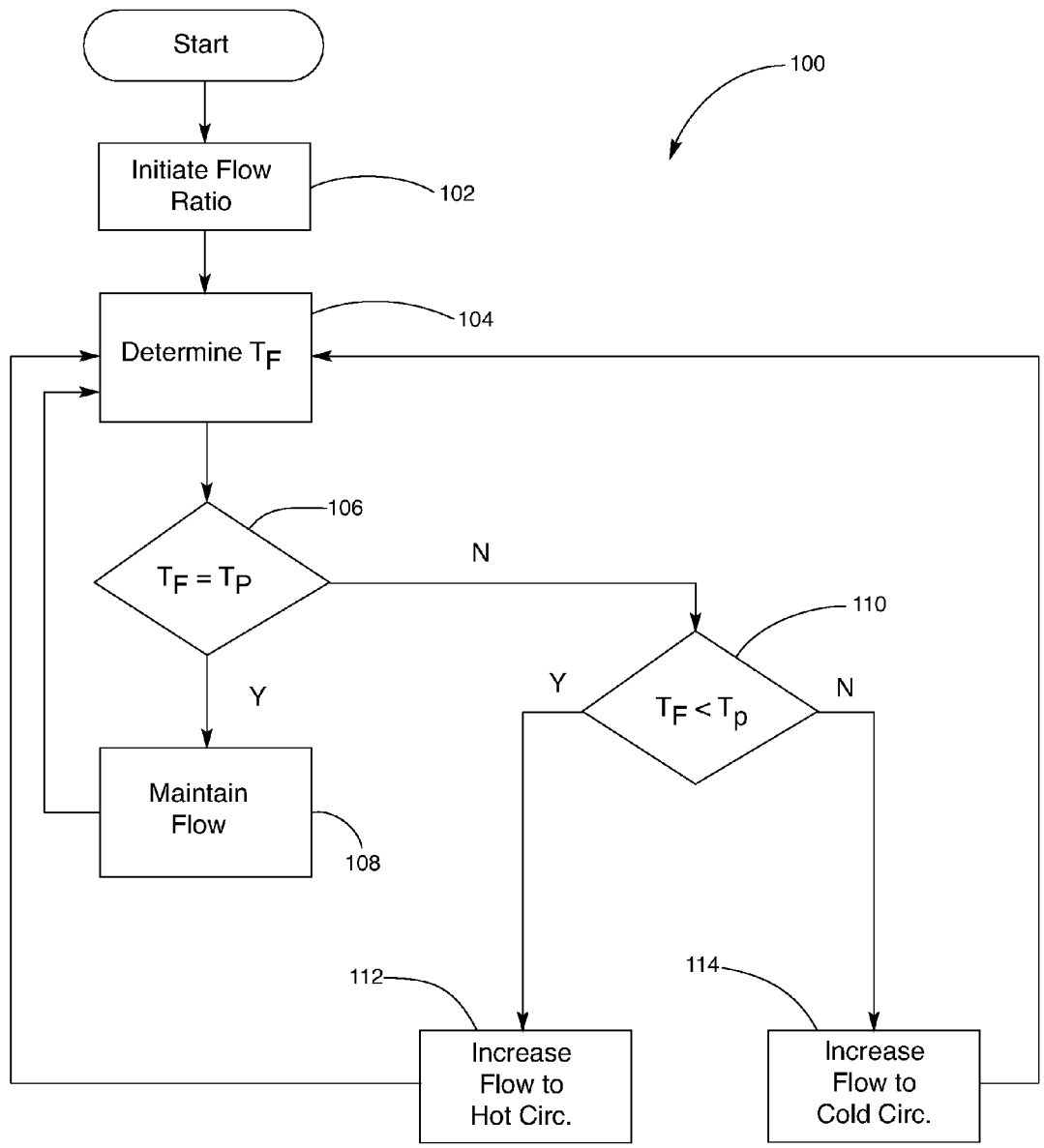
FIG. 2 is a flowchart representing a method of active thermal management of transmission fluid outflow.

Referring to FIG. 2, one embodiment of a method for active thermal management of transmission fluid outflow 100 is shown in flowchart form. The system is started automatically whenever the vehicular engine is started, and transmission fluid begins flowing into hot and cold circuits at an initial flow ratio in step 102. The initial flow ratio may be set based upon specific vehicular applications, but is not essential to the operating cycle of the method after initial startup. Process step 104 involves continuously sensing the temperature of the transmission fluid ($T_F$), which is then compared with a predetermined temperature ($T_P$) in decision step 106.

The predetermined temperature $T_P$ is calibrated based upon a temperature at which the transmission operates at optimal levels for a specific vehicular application, and may be a temperature range. If $T_F$ is equal to $T_P$, the system simply maintains fluid flow into the hot and cold circuits at the current ratio, as shown in step 108. If $T_F$ is not equal to $T_P$, a change in the flow ratio to circuits will be made in decision step 110. When $T_F$ is lower than $T_P$, optimal transmission performance requires that the transmission fluid be heated, and the system will direct a greater amount of transmission fluid flow into the hot circuit, process step 112. When $T_F$ is not lower than $T_P$, optimal transmission performance requires that the transmission fluid be cooled, and the system will direct a greater amount of transmission fluid flow into the cold circuit, process step 114. These respective increases in flow to the hot and cold circuits would effectively increase or decrease the temperature of transmission fluid in the transmission, yielding improved transmission performance.

In an embodiment of the method 100 which corresponds to use of the system 8 of FIG. 1, sensor 18 would perform the monitoring function of step 104 and the logic functions of steps 106 and 110. Furthermore, valve 16 would perform the transmission fluid flow ratio adjustments of processes 108, 112, and 114.

While the best modes for carrying out the invention have been described in detail, those familiar with the art to which this invention relates will recognize various alternative designs and embodiments for practicing the invention within the scope of the appended claims.

The invention claimed is:

1. An active thermal management system, comprising:
   a transmission having transmission fluid;
   a first circuit;
   a second circuit;
   at least one valve in fluid communication with said transmission, said first circuit, and said second circuit; a common return path fluidly connected to said first circuit, said second circuit and said transmission such that said transmission fluid can flow from at least one of the first and second circuits, through the return path, to said transmission; wherein said at least one valve is configured to selectively vary fluid flow from said transmission to each of said first and second circuits; and
   a control system configured to measure a material property of said transmission fluid and operatively connected to said at least one valve and configured to control said valve based upon the measurement of said material property.

2. The active thermal management system of claim 1, wherein said material property measured by said control system is temperature.

3. The active thermal management system of claim 1, wherein said material property measured by said control system is viscosity.

4. The active thermal management system of claim 1, further including a heat source, wherein said transmission fluid in said first circuit is in heat transfer relationship with said heat source.

5. The active thermal management system of claim 4, further including a passenger compartment heater circuit having a heater core, wherein said heat source is not in heat transfer relationship with said passenger compartment heater circuit.

6. The active thermal management system of claim 1, further including a heat sink, wherein said transmission fluid in said second circuit is in heat transfer relationship with said heat sink.

7. The active thermal management system of claim 1, further comprising an air to fluid heat exchanger in fluid communication with said second circuit.

8. The active thermal management system of claim 1, wherein said at least one valve is configured to selectively provide a mode of operation in which said transmission fluid simultaneously flows from said first and second circuits to said transmission.

9. The active thermal management system of claim 1, wherein said control system includes a sensor configured to monitor a material property of the fluid and an actuator configured to manipulate said valve.

10. The active thermal management system of claim 9, wherein said sensor is said actuator.

11. An active thermal management system for a transmission usable with a vehicular engine, comprising:
    a transmission having transmission fluid;
    a coolant system fluidly connected to said vehicular engine, including a radiator having a hot tank and a cold tank respectively defined by a relatively high coolant temperature area and a relatively low coolant temperature area in said coolant system;
    a first circuit;
    a second circuit;
    at least one valve in fluid communication with said transmission, said first circuit, and said second circuit; a common return path fluidly connected to said first circuit, said second circuit and said transmission such that said transmission fluid can flow from at least one of the first and second circuits, through the return path, to said transmission; wherein said at least one valve is configured to selectively vary fluid flow from said transmission to said first and second circuits; and
    a control system configured to measure a material property of said transmission fluid and operatively connected to said at least one valve and configured to control said valve based upon the measurement of said material property.

12. The active thermal management system of claim 11, wherein said material property measured by said control system is temperature.

13. The active thermal management system of claim 11, wherein said material property measured by said control system is viscosity.

14. The active thermal management system of claim 11, further including a heat source, wherein said first circuit is in heat transfer relationship with said heat source, and wherein said heat source is said hot tank.

15. The active thermal management system of claim 11, further including a heat sink, wherein said second circuit is in heat transfer relationship with said heat sink, and wherein said heat sink is said cold tank.

* * * * *